United States Patent [19]

Nusbaum et al.

[11] Patent Number: 5,845,831
[45] Date of Patent: Dec. 8, 1998

[54] DETACHABLE CARRIER FOR AUTOMOBILES

[75] Inventors: Henry Nusbaum, Los Angeles; Neil Nusbaum, Culver City, both of Calif.

[73] Assignee: Hollywood Engineering, Inc., Los Angeles, Calif.

[21] Appl. No.: 923,855

[22] Filed: Sep. 3, 1997

[51] Int. Cl.⁶ ................................ B60R 9/10; B60R 9/06
[52] U.S. Cl. .................... 224/505; 224/502; 224/521; 224/532; 224/535; 224/924; 414/462
[58] Field of Search ..................... 224/282, 488, 224/502, 504, 505, 506, 507, 508, 522, 523, 531, 532, 518, 519, 521, 924, 535, 42.21; 414/462

[56] References Cited

U.S. PATENT DOCUMENTS

| | | | |
|---|---|---|---|
| 437,253 | 9/1890 | Sheehan | 248/292.13 |
| 1,866,013 | 7/1932 | Coquille | 224/42.21 |
| 3,613,971 | 10/1971 | Betz | 224/503 |
| 4,484,699 | 11/1984 | Heck | 224/504 |
| 5,067,641 | 11/1991 | Johnson et al. | 224/532 |
| 5,108,018 | 4/1992 | Spinka | 224/506 |
| 5,370,285 | 12/1994 | Steelman | 224/42.21 |
| 5,529,231 | 6/1996 | Burgess | 224/502 |
| 5,690,260 | 11/1997 | Aikins et al. | 224/505 |

*Primary Examiner*—Allan N. Shoap
*Assistant Examiner*—Gregory M. Vidovich
*Attorney, Agent, or Firm*—Fish & Richardson P.C.

[57] ABSTRACT

A car carrier adapted to mount to a trailer hitch of a vehicle with a motion-dampening mechanism. The carrier includes a horizontal hitch insert assembly, an upright column assembly rotatably engaged to the horizontal hitch insert assembly and at least one resistive member coupled to the upright column assembly. The resistive member can be actuated to produce a resistive force along the horizontal hitch insert assembly to dampen a movement of the upright column assembly when the upright column assembly is rotated.

8 Claims, 7 Drawing Sheets

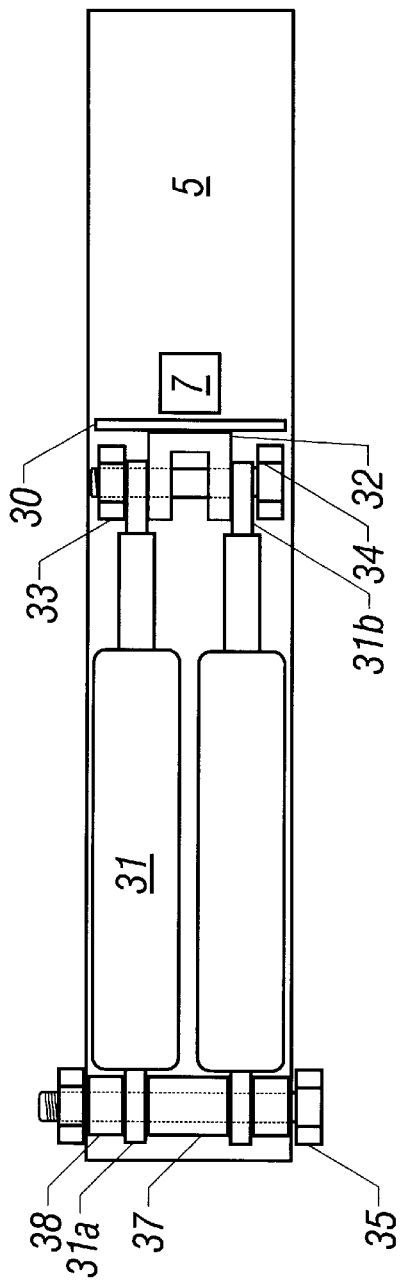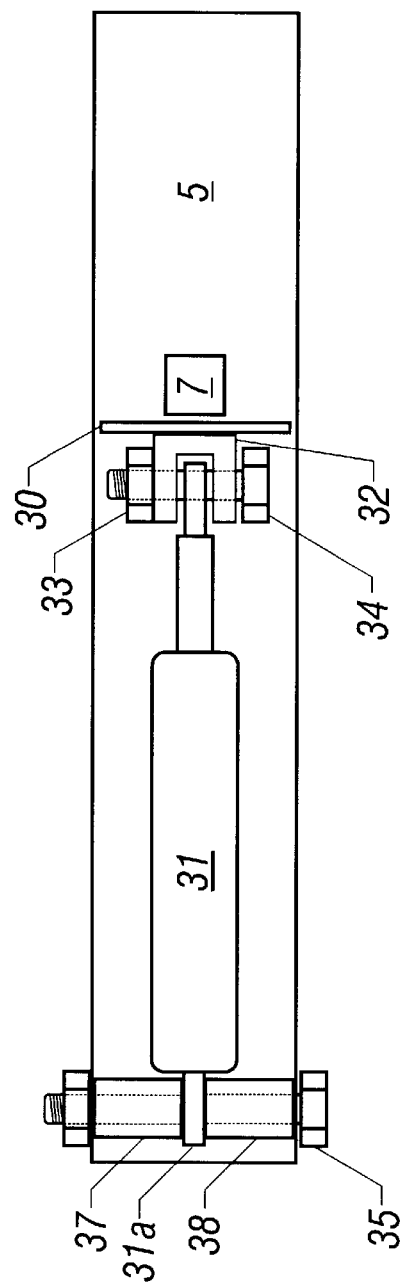

DETACHABLE CARRIER FOR AUTOMOBILES

FIELD OF THE INVENTION

The invention relates to a carrier for automobiles, and more specifically, to a force-dampened tilting carrier mountable to a vehicle trailer hitch.

BACKGROUND OF THE INVENTION

A carrier is sometimes attached onto a vehicle to carry extra or large items that do not easily fit into the limited cargo space of the vehicle. A bicycle is often carried on a bicycle carrier. Such a carrier can be made detachable so that it can be removed from a vehicle when not in use. One convenient mechanism is to mount the carrier to the trailer hitch installed on a vehicle.

Some conventional trailer-hitch mounted carriers may obstruct access to the rear cargo door of a vehicle, particularly when a bicycle or other items are loaded. This is inconvenient since a user may need to unload the carry-on items or even remove the carrier in order to access the rear door.

A number of carriers have been designed to obviate this problem. U.S. Pat. No. 5,114,120 to Lovci discloses a carrier having a upright column that can swing out and rotate to the side of the vehicle to facilitate the access to the rear door.

Another carrier design disclosed in U.S. Pat. No. 5,529,231 to Burgess implements a pivoting mechanism that allows for a rotational movement of an upright column so that the upright column can be tilted away from the rear door of the vehicle. More specifically, the upright column is mounted on a pivot in a horizontal mounting insert. In addition, a gas shock is connected to both the mounting insert and the upright column at an angle relative to the horizontal mounting insert to provide a resistive force that lessens the rotational speed of an article support member attached to the upright column.

SUMMARY OF THE INVENTION

It is one object of the present invention to provide a detachable carrier that allows for convenient access to the rear cargo door of a vehicle.

It is another object of the invention to provide a removable security feature on a carrier to prevent theft of carry-on items.

It is yet another object of this invention to provide a removable holding mechanism to the carrier without increasing the carrier's overall length and adding structural complexity.

A carrier according to one embodiment of the invention includes a horizontal hitch insert assembly attachable to a trailer hitch, an upright column assembly rotatably coupled to the hitch insert assembly, a pivoting element connected to the hitch insert assembly and the upright column assembly to effect a rotation of the upright column assembly relative to the hitch insert assembly, and a resistive member mounted on the hitch insert assembly and mechanically coupled to the upright column assembly to dampen a movement of the upright column assembly. The upright column assembly has a load holding assembly to securely hold one or more items for transport.

A lock mechanism is implemented in the horizontal hitch insert assembly to lock the upright column assembly at a position substantially orthogonal to the horizontal hitch insert assembly.

When the upright column assembly is not locked, it is rotatable with respect to the horizontal hitch insert assembly about a joint point at which the horizontal hitch insert assembly and the upright column assembly are coupled. The rotational motion of the upright column, which has an attached cam lever or equivalent attached thereto, actuates the resistive member to produce a resistive force substantially parallel to the horizontal hitch insert assembly. The resistive force dampens the rotational movement of the upright column.

The resistive member may be configured to provide adjustable resistance according to the weight of the items loaded on the upright column.

The carrier of the present invention is an alternative design to the car carrier disclosed in U.S. Pat. No. 5,529,231 to Burgess, supra. and provides additional features and operation flexibility.

These and other aspects and advantages will become more apparent in light of the following detailed description, the accompanying drawings, and the claims.

BRIEF DESCRIPTION OF THE DRAWINGS

FIG. 6A is a top cut-away view of the hitch insert assembly, utilizing two gas springs as the resistive members in compressed positions.

FIG. 6B is a top cut-away view of the hitch insert assembly, utilizing a single gas spring as the resistive member in a compressed position.

DETAILED DESCRIPTION OF THE INVENTION

In the following description, several embodiments of the invention are described as exemplars to illustrate the implementation of the invention. The specific features and details embedded in these embodiments should not be construed to limit the scope of the invention.

Figure 1:
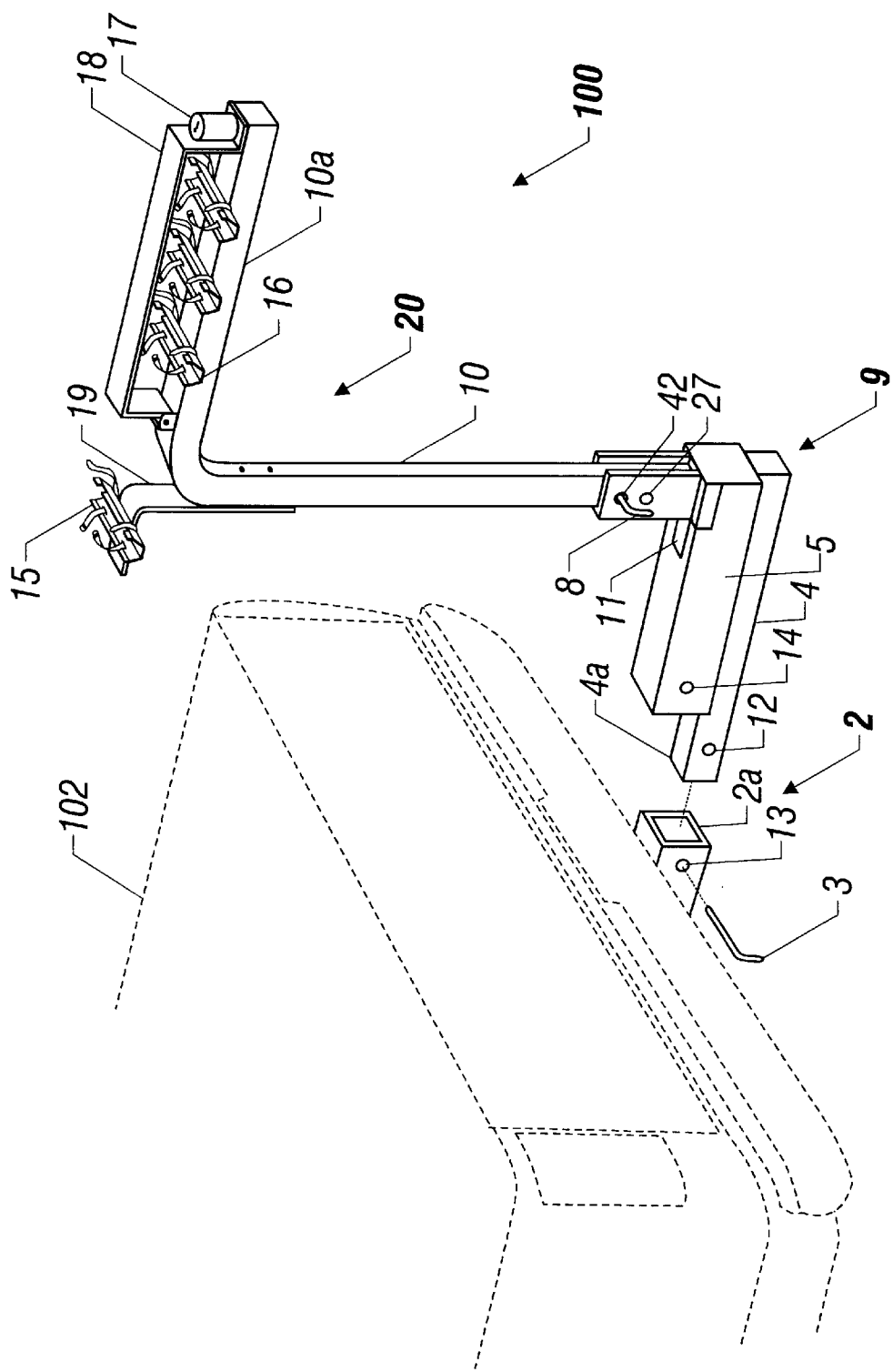
FIG. 1 is a perspective view of one embodiment of the carrier with the upright column assembly in its vertical position.
Figure 2:
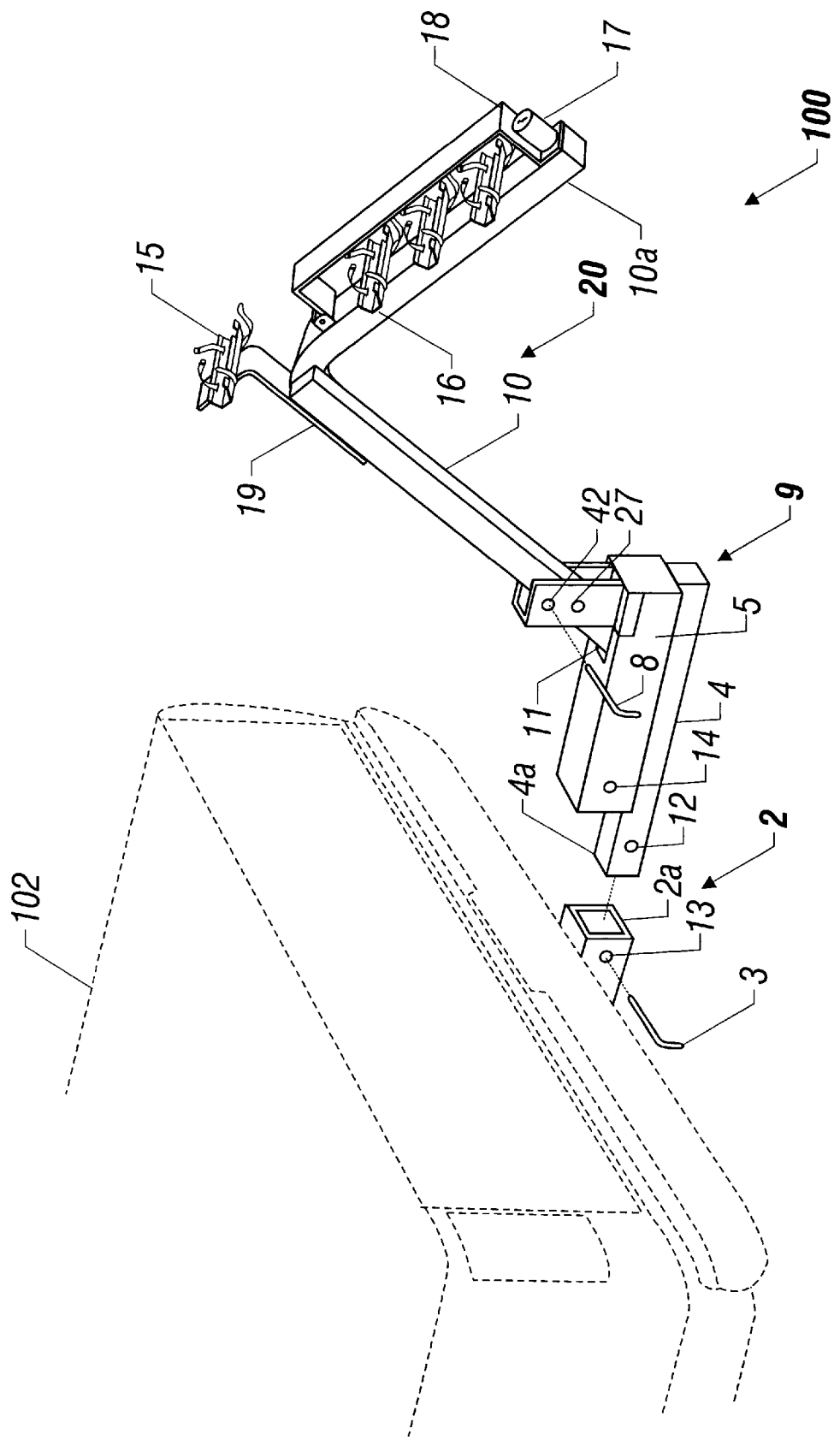
FIG. 2 is a perspective view of the carrier with the upright column assembly rotated downward to facilitate access to the rear of a vehicle.

FIGS. 1 and 2 show one embodiment 100 of the carrier of the invention. The carrier 100 includes a horizontal hitch insert assembly 9 and an upright column assembly 20. The horizontal hitch assembly 9 has a hitch rack receiver tube 4, a resistive member housing 5, and an upright column pivot bracket 6. The upright column assembly 20 has a upright column 10 and a holding member 10a that is substantially orthogonal to the upright column 10.

The hitch rack receiver tube 4 has a receiving end 4a that is configured to engage to a trailer hitch 2 of a vehicle 102.

In the example in FIG. 1, the trailer hitch 2 is of a common type which has a square or rectangular hitch opening 2a with a security hole 13. For this trailer hitch 2, the receiving end 4a has a similar shape but is smaller in dimension by a predetermined amount in order to fit into the tailer hitch 2. The hitch rack receiver tube 4 has a security hole 12 compatible to the security hole 13 on the trailer hitch 2 so that holes 12 and 13 are substantially aligned relative to each other when the hitch rack receiver tube 4 is properly engaged with the trailer hitch 2. A pin 3 may be inserted through holes 13 and 12 to secure the engagement. The pin 3 may have a hole to allow a padlock or spring clip to lock the pin 3.

Spring housing tube 5 may be mounted to the hitch rack receiver tube 4 by means of welding or fasteners. Attachment of the upright column pivot bracket 6 to the spring housing tube 5 can also be done by welding or fasteners. The upright column 10 is rotatably attached to the upright column pivot bracket 6 by means of a pivot bolt 27 fixed at a position in the upright column pivot bracket 6. A retaining hole 42 located above the pivot bolt 27 in the upright column pivot bracket 6 and a matching retaining hole 42a on the upright column 10 are implemented for securely locking the upright column 10 by inserting a retaining pin 8 through the holes 42 and 42a. When the retaining pin 8 is properly inserted, the upright column 10 is substantially perpendicular to the hitch rack receiver tube 4. This is the preferred position when the carrier 100 is in use.

The holding member 10a in the upright column assembly 20 includes at least one article-retaining member 16, e.g., a bicycle carrier. The article-retaining member 16 may be configured to carry a wide range of articles such as bicycles, wheelchairs, skis, snow boards, etc. A bicycle carrier is described herein as an example. FIGS. 1 and 2 shows three bicycle carriers mounted on the holding member 10a by a removable locking bar 18 that is secured by means of a lock 17. The holding member 10a may be formed by bending an extended portion of the upright column 10 or by welding/fastening a separate holding piece to the upright column 10.

Figure 3:
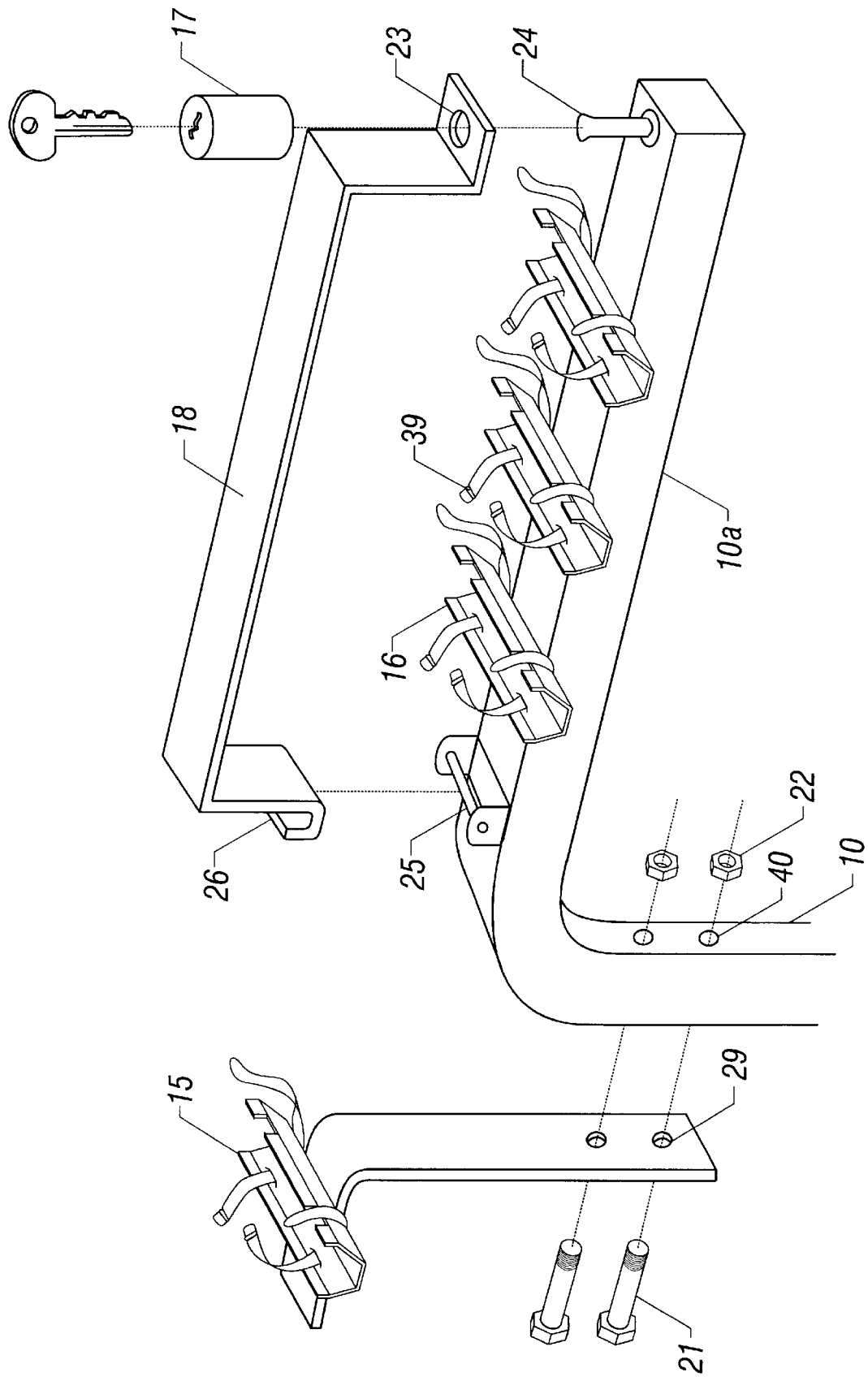
FIG. 3 is a perspective view of the locking mechanism and extra article-retaining member in the upright column assembly.

FIG. 3 shows additional details of the removable locking bar 18 and the lock 17. The locking bar 18 is attached to the holding member 10a by means of a pivot bracket 25 welded or fastened to the holding member 10a. One end 26 of the locking bar 18, is shaped into an approximately 180° angle tip in order to freely rotate about the pivot bracket 25. The end 26 of the locking bar 18 can be disengaged and removed from the pivot bracket 25 by tilting the bar 10 relative to the holding member to a specific angle. The other end of locking bar 18 has a hole 23 so as to accommodate a locking system as depicted by a lock pin 24 and the lock 17. Lock pin 24 may be welded or fastened to holding member 10a. When the locking bar 18 is installed and pivots around the pivot bracket 25 to its lowest position to engage with the lock pin 24, the lock pin 24 will protrude out of the hole 23. At this position, the lock 17 can then be secured to the lock pin 24. The outer dimension of the lock 17 is greater than the diameter of the hole 23 to ensure that the locking bar 18 is securely locked.

FIGS. 1, 2 and 3 also show a bicycle carrier tray as an example of the article-retaining member 16. The bicycle tray includes a fastening means 39 such as straps to maintain a bicycle in a secure position.

The carrier 100 may also accommodate an extra article-retaining member 15 to the upper portion of the upright column 10 by mounting a removable bracket 19. Referring to FIGS. 1, 2 and 3, the removable bracket 19 can be bolted to the upright column 10 with bolts 21 which are inserted through holes 29 on the bracket 19 and 40 on the upright column 10 and fastened with nuts 22.

Referring back to FIG. 2 which depicts the rotated position of the upright column assembly 20, the upright column 10 is mechanically coupled to a resistive member within the resistive member housing 5 by a cam lever 7 that is welded or fastened to the bottom of the upright column 10.

Figure 4:
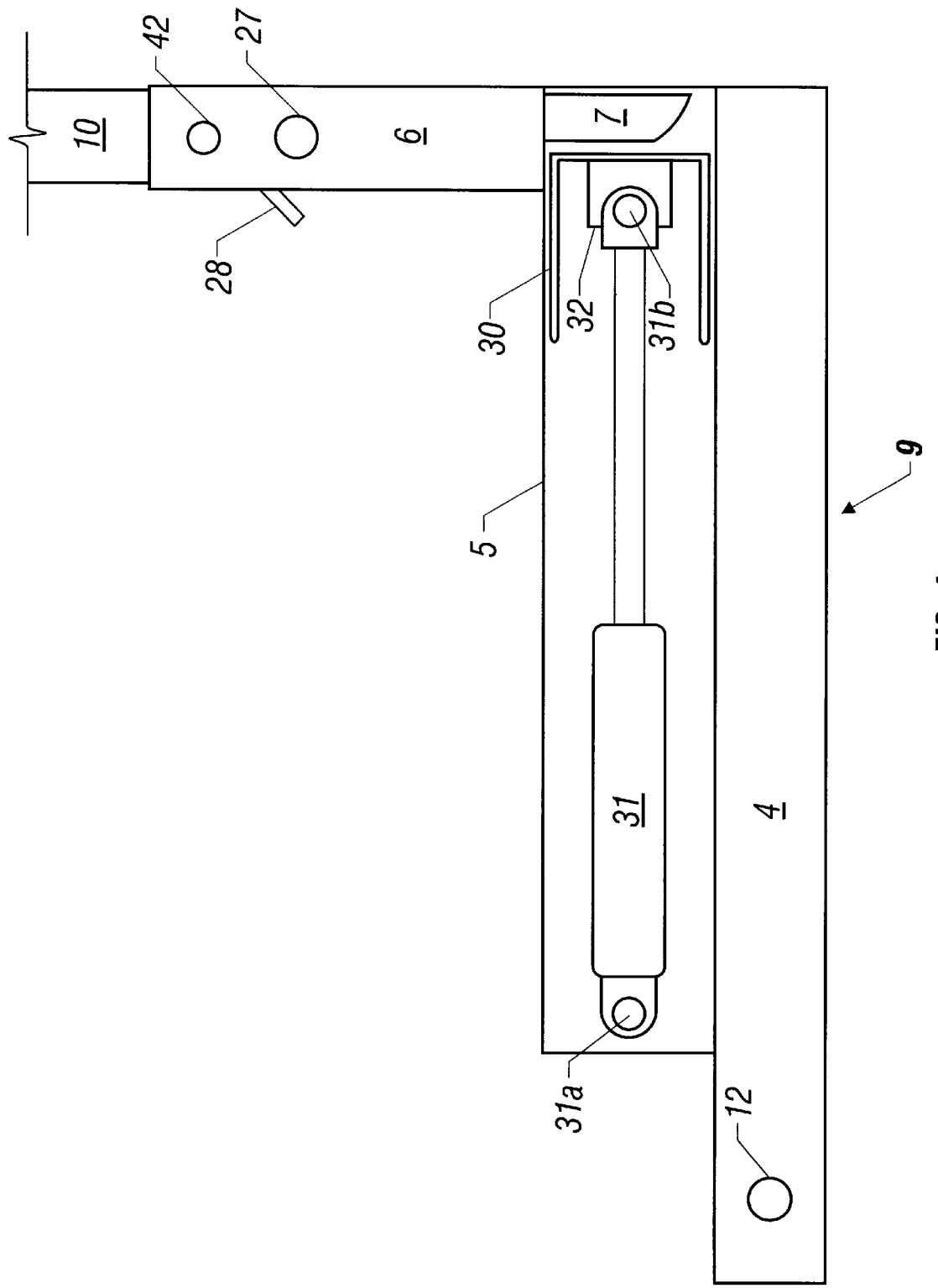
FIG. 4 is a side cut-away view of the hitch insert assembly, utilizing a gas spring as the resistive member with upright column in the vertical position.
Figure 5:
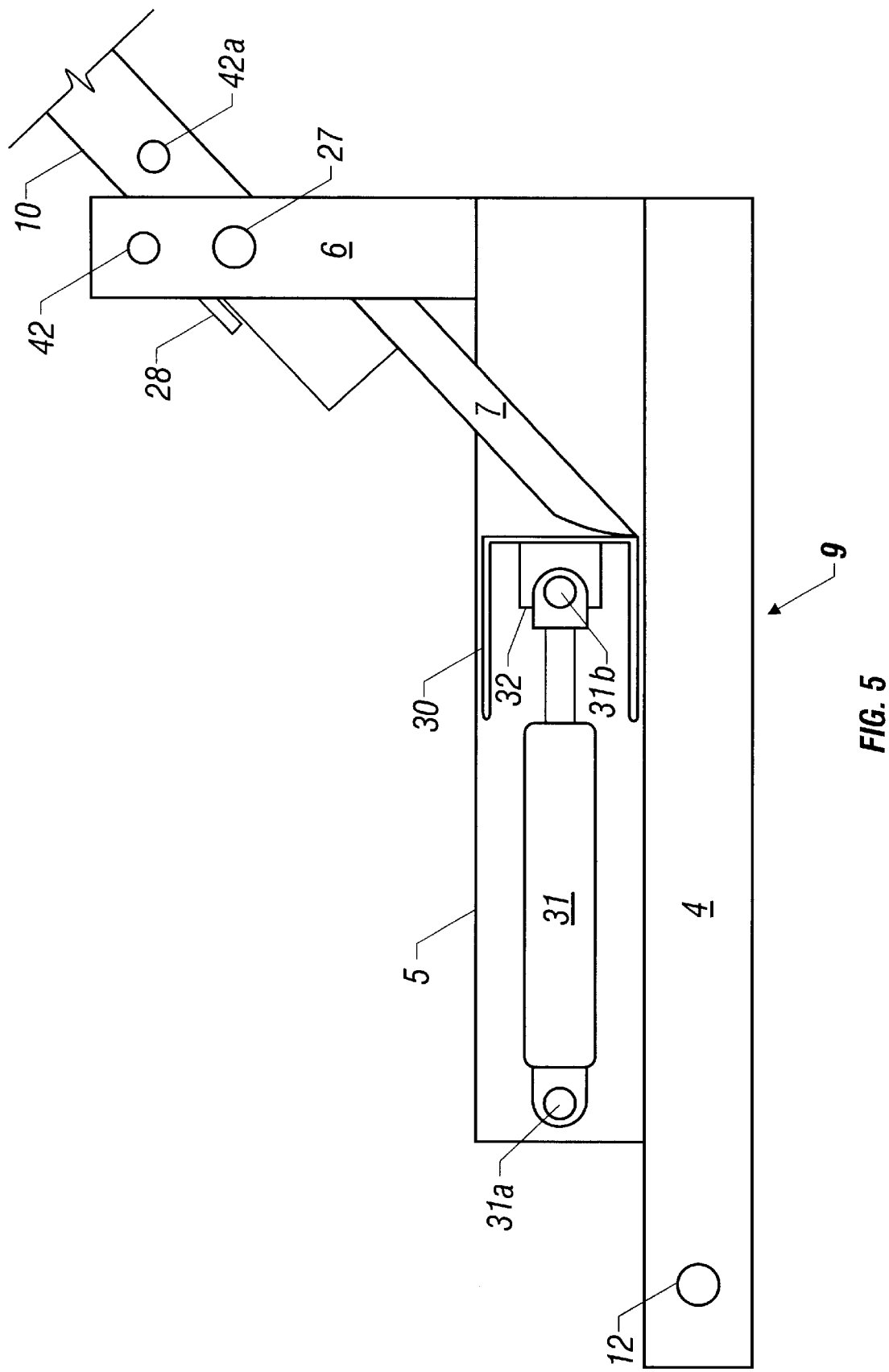
FIG. 5 is a side cut-away view of the hitch insert assembly, utilizing a gas spring as the resistive member with upright column in a rotated position.

FIGS. 4 and 5 further illustrate this coupling mechanism. The resistive member housing 5 has an open slot 11 to accommodate the sliding movement of the cam lever 7. A resistive member 31, which is shown as a gas spring system, has a spring retainer U-bracket 30 that is welded or fastened by a spring fastener block 32. The front of the spring 31 is attached to both sides of the spring retainer U-bracket 30 by using a bolt 34 that passes through a spring mounting hole 31b. The rear end of the spring 31 is fixed to the resistive member housing 5 by means of a bolt 35 through a hole 14 in the resistive member housing 5 and a spring mounting hole 31a. Preferably, the spring 31 is substantially aligned in parallel to the longitudinal axis of the horizontal hitch insert tube 4. In such a configuration, the resistive force caused by compressing the spring 31 is essentially parallel to the longitudinal axis of the horizontal hitch insert tube 4.

It should be noted that, in this embodiment, the resistive member 31 is entirely mounted onto the horizontal hitch insert assembly 9 and is not connected to the upright column assembly 20. In operation, mechanical coupling between the resistive member 31 and the upright column assembly 20 is initiated by pressing the cam lever 7 against the resistive member 31 upon a rotation of the upright column assembly 20 about the pivoting point 27.

The resistive member housing 5 is implemented herein to provide a convenient way of placing one or more resistive members 31 and may be unnecessary to practice the invention. For example, the one or more resistive members 31 may be directly mounted onto the horizontal hitch insert tube 4. Alternatively, an indentation may be made in the horizontal hitch insert tube 4 to hold one or more resistive members 31.

When the upright column 10 is at its vertical position, the cam lever 7 is preferably disengaged with the resistive member 31. This configuration is shown in FIG. 4. Alternatively, the system may be configured so that the resistive member 31 is lightly coupled with the cam lever 7 by being in contract with a minimum resistive force in the resistive member 31 when the upright column 10 is at its vertical position.

When the retaining pin 8 is removed, the upright column 10 is rotatable by pivoting about the bolt 27. As the upright column 10 rotates clock-wise, the cam lever 7 presses against the U-bracket 30 (FIG. 5). Spring 31 responds to the compression by producing a resistive force parallel to the longitudinal axis of the horizontal hitch insert tube 4 to resist the motion of cam lever 7. Therefore, the spring 31 dampens the downward motion of the upright column 10. FIGS. 4 and 5 also show an optional stop plate 28 on the pivot bracket 6 which limits the maximum amount of rotation of the upright column assembly 20.

Depending on the load that is carried on the carrier, the dampening force may be adjustable for convenience of use. In most cases, it may be desirable to increase the dampening force as the load increases. This can be accomplished by varying the number of resistive members installed in the carrier.

In a configuration shown in FIG. 6A, two springs are installed to resist the downward motion of upright column assembly 20. The spring fastener block 32 has a center slot for installing a single spring. When two springs are installed, the front ends of the springs are attached to the both sides of the spring fastener block 32. A bolt 34 and a nut 33 may be used for mounting the springs. Alternatively, the nut 33 and bolt 34 can be replaced by a retaining pin and clip for easy removal, which eliminates the need for tools. The rear of springs 31 are attached to the spring housing tube 5 via a bolt 35 that passes through hole 14 on the resistive member housing 5, bushings 37 and 38. A nut 36 fastens to bolt 35. Alternatively, the nut 35 and bolt 36 can be replaced by a retaining pin and clip.

When a lesser dampening force is desired, one of the springs can be easily removed and the remaining spring should be re-installed to fit into the center slot of the spring fastener block 32. In operation, the upright column 10 should be locked in its vertical position by installing the retaining pin 8 installed in hole 42 and the upright column 10. Bolt 35 or equivalent should be removed first and then springs 31 and U-bracket 30 can be removed from the resistive member housing 5. Next, the bolt 34 or equivalent may be removed. This allows for removal of one of the springs 31. The other spring should then be moved to the center slot position of block 32. Bolt 34 and nut 33 or equivalent are then installed through hole 31b. Spring 31 and U bracket 30 would then be reinserted into the resistive member housing 5. The bolt 35 and the bushings 37 and 38 should be installed in such a way that the single spring 31 is parallel to the housing 5. FIG. 6B shows a resistive member housing with a single spring installed.

Figure 7:
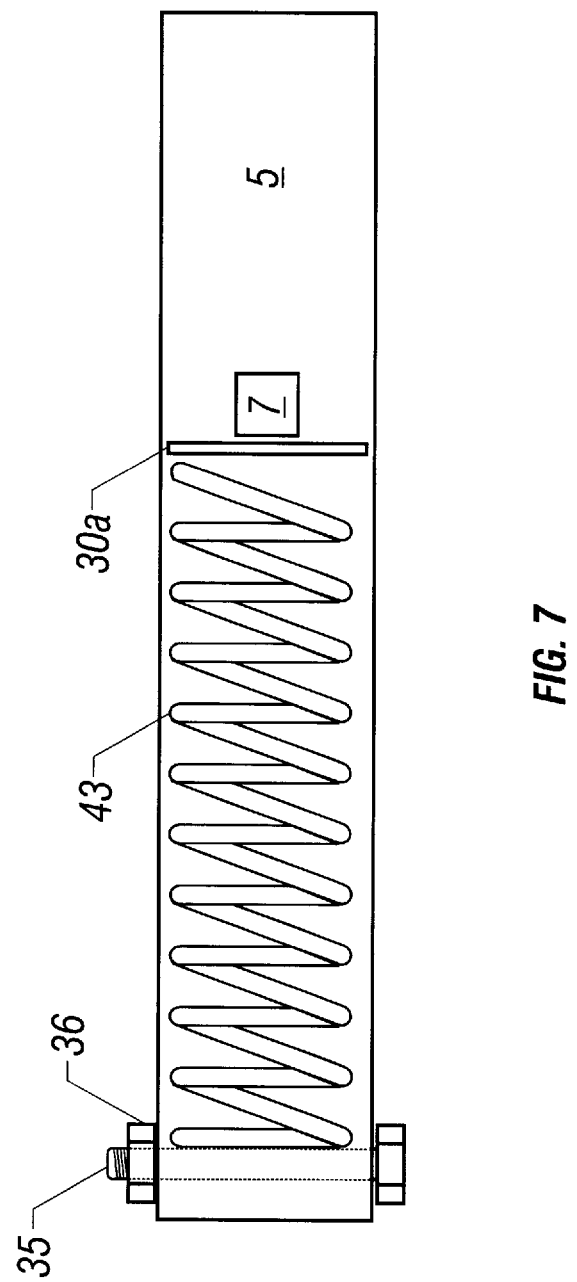
FIG. 7 is a top cut-away view of the hitch insert assembly, utilizing one mechanical spring as the resistive member in a compressed position.

In the above description, a gas spring is used as the resistive member. In general, any other resistive member may also be used including but not limited to a hydraulic resistive member and a mechanical spring. FIG. 7 shows that one mechanical spring 43 is in use. The mechanical spring 43 spring is depicted as a wire compression spring, but it can also be a rubber or rubber-plastic compound which expands upon compression. The spring 43 can be replaced with a stronger or weaker spring from spring housing tube 5 by removal of bolt 35 and nut 36 or equivalent. A strong spring would be used for heavy loads and a weak spring for light loads. Spring 43 is maintained within the U-bracket 30a. Alternatively, the dampening force may also be adjusted by varying the number of mechanical springs in the resistive member housing 5.

Although the present invention has been described in detail with reference to a few specific embodiments, one ordinarily skilled in the art to which this invention pertains will appreciate that various modifications and enhancements may be made without departing from the scope of the invention, which is intended to be encompassed by the following claims.

What is claimed is:

1. A detachable carrier adapted for use with a trailer hitch, comprising:
   a hitch insert assembly configured to removably attach to the trailer hitch, said hitch insert assembly defining a hitch insert axis along at least a part of its length;
   a column assembly rotatably coupled to said hitch insert assembly and configured to have at least one article-retaining member for holding at least one article for transport;
   a pivoting element mounted to said hitch insert assembly and connected to said column assembly, said pivoting element allowing said column assembly to rotate with respect to said hitch insert assembly; and
   at least one resistive member mounted to said hitch insert assembly, said resistive member operable to effect a resistive force along said hitch insert axis to dampen a movement of said column assembly about said pivoting element, when said movement initiates a mechanical coupling between said column assembly and said resistive member.

2. A detachable carrier as in claim 1, wherein said resistive member includes an adjustment mechanism operable to change said resistive force.

3. A detachable carrier as in claim 1, wherein said resistive member includes a gas spring or a mechanical spring.

4. A detachable carrier as in claim 1, wherein said hitch insert assembly comprises:
   a hitch rack receiver tube which has a receiving end attachable to the trailer hitch, said hitch rack receiver tube defining said hitch insert axis; and
   a pivot bracket mounted on said hitch rack receiver tube to hold said pivoting element.

5. A detachable carrier as in claim 4, further comprising a lock in said pivot bracket that is operable to lock said column assembly at a position that is substantially perpendicular to said hitch insert axis.

6. A detachable carrier as in claim 1, wherein said column assembly includes a column that couples to said hitch insert assembly and a holding member that is substantially orthogonal to said column, said holding member configured to hold said article-retaining member.

7. A detachable carrier as in claim 6, further comprising a removable article-retaining member that is attachable to a portion of said column.

8. A detachable carrier adapted for use with a trailer hitch, comprising:
   a hitch insert tube configured to removably attach to the trailer hitch, said hitch insert tube defining a hitch insert axis along at least a part of its length;
   a column rotatably coupled to said hitch insert tube and configured to have at least one article-retaining bar that is substantially orthogonal to said column;
   a pivoting element engaged to said hitch insert tube and connected to said column, said pivoting element allowing said column to rotate with respect to said hitch insert tube; and
   a resistive member housing mounted to said hitch insert tube and holding a plurality of removable resistive members, each of said resistive members operable to dampen a movement of said column about said pivoting element by effecting a resistive force along said hitch insert axis when said movement initiates a mechanical coupling between said column and said resistive members.

* * * * *